3,725,298
PREPARATION OF MIXED OXIDES
James Louis Woodhead, Didcot, Ronald Michael Dell, Goring-on-Thames, Anthony Richard Junkinson, Wantage, and Raymond Westrop Wilkinson, Goring-on-Thames, England, assignors to United Kingdom Atomic Energy Authority, London, England
No Drawing. Filed Mar. 10, 1969, Ser. No. 805,860
Claims priority, application Great Britain, Mar. 12, 1968, 1,210/68
Int. Cl. B01j *13/00;* C04b *35/26, 35/64*
U.S. Cl. 252—317         7 Claims

ABSTRACT OF THE DISCLOSURE

A method of making mixed-oxides comprises taking an aqueous solution having the right balance of metal ions, dispersing it in an inert organic liquid, mixing it with a base solution in the inert organic liquid, especially a long chain aliphatic amine separating out the gel particles so formed and heating them to effect a solid state reaction.

BACKGROUND OF THE INVENTION

The present invention relates to the preparation of ceramic materials of the general type comprising mixed oxides.

It should be explained that the term "mixed-oxide" as used herein is to be understood as including mixed-oxide compounds but as excluding mere physical admixtures of oxides. As examples, which are not exclusive, of the mixed-oxides with which the preesnt invention is concerned there may be mentioned ferrites, zirconates, titanates and spinels. These ceramic materials have widespread uses in the refractory and electrical industries as insulating and structural refractories, or as magnets, inductors, dielectrics, or piezo-electric materials.

Heretofore these mixed-oxides have usually been prepared by sintering together a physical admixture of the relevant base oxides. In place of the base oxides it is possible to use compounds, e.g. hydroxides, carbonates or oxalates, which will decompose on heating to give these base oxides. It will be understood that the mixed-oxides are made from the mixture of base oxides by a solid state reaction and it will also be well known that the reactivity of the mitxure and consequently the rate of formation of the mixed-oxides will depend upon the state of sub-division of the mixture of base oxides from which the mixed-oxides are prepared.

One conventional route for the formation of these mixed-oxides has hitherto been to grind together the mixture of base oxides so as to reduce their particle size to a satisfactory value; the mixture is then fired and the grinding and firing cycle repeated as necessary. This route is tedious but has the advantage of availability and cheapness of starting materials. A disadvantage inherent in a solid state reaction between finely ground powders is that some volatilisation of certain of the components may take place before the reaction is complete and this may lead to an inhomogeneous product. Moreover the starting materials may be of non-constant quality and impurities may well be introduced or segregation may take place during the mixing and milling processes.

In order to produce high purity reproducible technical ceramics it has sometimes been the practice to make use of a "wet" or solution process in which mixing takes place in solution and a chemical co-precipitation route is then used in order to co-precipitate the oxides, hydroxides or oxalates from the mixed salt solution. It is of course apparent that the co-precipitated mixture can be made in a finely divided form and indeed in the colloidal state which is extremely desirable from the point of view of the reaction. Unfortunately it is equaly well known that such a precipitate is often extremely intractable and, if precipitate, it is almost impossible to avoid leaching or it is desired to remove entrained electrolytes from the peptising of some of the wanted components of the mixture and their selective removal. The reagents used in forming the precipitate may also introduce impurities of alter the chemical constitution by forming soluble complexes. In other words the co-precipitate when produced is in extremely desirable physical form but its chemical constitution cannot be guaranteed.

It is an object of the present invention to overcome at least some of the above-mentioned difficulties.

SUMMARY OF THE INVENTION

The present invention comprises providing an aqueous solution containing metal salts in the required proportions, said metal salts being capable of undergoing a solid state reaction to form a mixed oxide refractory material, dispersing the solution in an inert organic liquid to form a dispersion, mixing this dispersion with a long chain aliphatic amine soluble in said inert organic liquid, thereby to cause gelling of the dispersed aqueous phase by hydrolysis and formation of gelled particles, and thereafter separating the gelled particles from the organic phase and heating said gelled particles at a temperature sufficient to effect a solid state reaction between said metal salts.

Most conveniently the dispersion is added to long chain aliphatic amine.

Any suitable salts of the metals can be used provided that they are soluble in water, but we prefer to use the nitrates since generally these are extremely soluble and moreover residual traces of nitrate can be certain to decompose on heating, usually without the formation of volatile metal compounds. It should be noted that the ratio of acid anions to metal ions is not important in the solution and an excess or deficiency of acid anions may be present if this is desirable.

It should however be understood that at least one of the components of the mixture should be capable of forming a hydrous oxide gel. Normally this means that this component is an amphoteric oxide. Thus the solution should normally contain at least one ion selected from: zinc, cadmium, mercury, aluminium, scandium, yttrium, lanthanium and the lanthanides, thorium, uranium, plutonium, titanium, zirconium, hafnium, germanium, tin, lead, vanadium, niobium, tantalum, bismuth, chromium, molybdenum, tungsten manganese and iron. Additionally it may contain one or more ions of other metals but it will be understood that the ions present and their ratios are selected so that a subsequent solid state reaction to a mixed-oxide can in fact occur. Obviously it must be possible to form the aqueous solution containing the salts which must therefore not interact to form a precipitate.

Many inert organic liquids are suitable for forming the dispersion since the organic liquid merely acts as a suspending agent, but we have found that chlorinated hydrocarbons or kerosene are particularly suitable. Emulsifying or surface active agents may be added to aid the dispersion process and to help to control the size of droplets formed. Size control is also effected by the manner in which the mixture is stirred.

The long chain aliphatic amine extracts the acid from the aqueous droplets into the organic phase so that the salts in the droplets are hydrolysed and ultimately gelled into spheres of hydrous oxide.

The gel spheres, which should normally be less than 50 microns in dimeter to avoid segregation of the components during gelation, are filtered from the organic phase, washed and dried. Preferably these spheres are partially dehydrated by heating, e.g. at 150–350° C.

The particles, after drying, may be heated to a temperature typically in the range 500° C. to 1000° C. so that they are partially reacted to form the mixed-oxide but are not fully sintered. In this state they are extremely reactive and little crystallite growth has taken place; in the magnetic mixed oxides the individual crystallites composing the gel particles are sufficiently small to be superparamagnetic. If necessary the particles can be finely powdered (they are relatively soft) and then shaped by known techniques into artefacts, possibly with the addition of a binder. These artefacts may then be fully fired when further sintering and crystallite growth will take place. It is important that the initial heating should not be at such a high temperature that full sintering takes place as this may lead to undesirable electrical or magnetic properties in the fabricated artefact.

Alternatively it is possible deliberately to heat the particles (after drying) to such a temperature that full sintering takes place. Under these conditions, crystal growth within the particles occurs more readily than inter-particle growth, and thus by using particles of the desired size, a powder consisting entirely of single crystal grains may be manufactured. This mixed-oxide powder may, in the case of magnetic oxides, be dispersed in a suitable liquid to form a ferrofluid.

DESCRIPTION OF THE PREFERRED EMBODIMENTS

In order that the present invention may more readily be understood, six examples of the preparation of mixed-oxides in accordance with it will now be described by way of example.

EXAMPLE 1

Preparation of nickel zinc ferrite 404 millilitres of 2.47 M ferric nitrate solution were mixed with 41.2 millilitres of 3.65 M nickel nitrate solution and 88.9 millilitres of 3.93 M zinc nitrate solution to produce an aqueous solution wherein the nickel:zinc: iron atomic ratio was 3:7:20. This aqueous solution was dispersed in 2000 millilitres of 1-1-1-trichloroethane containing 6 millilitres of a surfactant, specifically Span 80. A solution was also made up containing 500 millilitres of trichloroethane, 1.5 millilitres of surfactant and 1125 millilitres of a long chain aliphatic amine, specifically that commercially available under the name Primene 81R. The dispersion was added to the amine solution with stirring over a period of 5 minutes and the reaction was allowed to continue for a further 15 minutes with gentle stirring. At the end of tihs time the product was allowed to settle and the supernatant liquid decanted. 1500 millilitres of trichloroethane were then added to the precipitated gel spheres and filtered off. The gel spheres were then washed with successive small quantities of trichlorothane to remove the amine nitrate. The gel spheres were then dried in air at 30° C. to remove the last traces of the organic liquids and were then heated at 300° C. so as to drive off water from the spheres. The product at this stage was translucent purple spheres about 10 microns in diameter, shown by X-ray diffraction to have the correct spinel structure. After crushing, toroidal pressings were made and sintered; they were found to have satisfactory B-H characteristics. Instead of crushing and pressing as above described, some of the gel spheres were fired in air at 1320° C. and the individual spheres were shown by electron microscopy to consist of single microcrystals of ferrite.

EXAMPLE 2

Manganese zinc ferrite

A similar procedure to that described with reference to Example 1 was carried out except that the aqueous solution consisted of 404 millilitres of 2.47 M ferric nitrate, 63.5 millilitres of 3.93 M zinc nitrate and 105.5 millilitres of 2.37 M manganese nitrate thereby to give an aqueous solution which contained manganese, zinc and iron in the ratio 1:1:4. As in Example 1, the correct spinel structure and magnetic properties developed on sintering.

EXAMPLE 3

Strontium ferrite

The procedure was the same as for Example 1 except that the aqueous solution consisted of 404 millilitres of 2.47 M ferric nitrate and 37 millilitres of 2.25 M strontium nitrate so that the strontium:iron ratio was 1:12. Once again the spheres were fired at 300° C. and were then fired again at 1000° C. After crushing and pressing this powder, permanent magnets were formed by sintering at 1250° C. in air and magnetising.

EXAMPLE 4

Yttrium iron garnet

The procedure was substantially the same as for Example 1 except that the aqueous solution was a mixture of iron and yttrium nitrates, with an iron:yttrium ratio of 5:3 and a nitrate concentration of 6 M. The gel spheres were dried in air at 30° C. After firing at 1070° C. the product was highly magnetic greenish-brown spheres of yttrium iron garnet approximately 30 microns in diameter.

EXAMPLE 5

Lead zirconate-titanate

A similar procedure to Example 1 was carried out except that the aqueous solution was made by dissolving 993.6 grams of lead nitrate in the least quantity of hot water and adding to it 680 millilitres of 1.4 M colloidal titanium hydroxide and 549 millilitres of 3.55 M zirconyl nitrate solution. This aqueous mixture was dispersed in trichloroethane and gelled by adding to a solution of 3000 millilitres of Primene 81R in 3 litres of trichloroethane. The gel particles were filtered off, washed five times with acetone, and dried at 110° C. The product was transparent yellow spheres approximately 10 microns in diameter which, when pressed and sintered at 1260° C., yielded dense fine-grained lead zirconate-titanate, with density 7.6 grams/cc. and possessing the correct structure (rhombohedrally-distorted perovskite phase of $PbZr_{0.65}Ti_{0.35}O_3$).

We claim:

1. A process for the formation of a mixed oxide, said process comprising making an aqueous solution containing metal salts in the required proportions, said metal salts being capable of undergoing a solid state reaction to form a mixed oxide refractory material, dispersing this solution in an inert organic liquid to form a dispersion, mixing this dispersion with a long chain aliphatic amine soluble in said inert organic liquid, thereby to cause gelling of the dispersed aqueous phase by hydrolysis and formation of gelled particles, and thereafter separating the gelled particles at a temperature sufficient to effect a solid state reaction between said metal salts.

2. The process of claim 1, wherein at least one of the said salts is capable of forming a hydrous oxide gel and at least one said salt is not so capable.

3. The process of claim 1, wherein the said inert organic liquid is a chlorinated hydrocarbon.

4. The process of claim 1, wherein the said inert organic liquid contains a surfactant.

5. The process of claim 1, wherein the gelled particles are heated to drive off at least part of their water content.

6. The process of claim 5, wherein the gelled particles are dried at 150° C. to 350° C.

7. The process of claim 1, wherein the gelled particles are heated to a temperature in the range 500° C. to 1000° C. so as to be partially reacted.

References Cited

UNITED STATES PATENTS

| | | | |
|---|---|---|---|
| 2,435,379 | 2/1948 | Archibald | 252—317 X |
| 2,450,394 | 9/1948 | Brown et al. | 252—448 |
| 2,631,983 | 3/1953 | Milliken, Jr. | 252—448 |
| 3,148,079 | 9/1964 | Banks et al. | 252—62.56 X |
| 3,290,122 | 12/1966 | Clinton et al. | 252—317 X |
| 3,309,169 | 3/1967 | Bayer | 252—62.9 X |

RICHARD D. LOVERING, Primary Examiner

U.S. Cl. X.R.

106—55, 57; 252—62.52, 62.57, 62.62, 62.63, 62.9, 63.2, 301.1 S; 264—67